US012385309B2

(12) United States Patent
Salutzki et al.

(10) Patent No.: US 12,385,309 B2
(45) Date of Patent: Aug. 12, 2025

(54) LINKAGE FOR A DOOR ACTUATOR

(71) Applicant: dormakaba Deutschland GmbH, Ennepetal (DE)

(72) Inventors: Thomas Salutzki, Ennepetal (DE); Sabine Wiemann, Ennepetal (DE); Alexander Hellwig, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 26 days.

(21) Appl. No.: 18/024,427

(22) PCT Filed: Sep. 7, 2020

(86) PCT No.: PCT/EP2020/074972
§ 371 (c)(1),
(2) Date: Mar. 2, 2023

(87) PCT Pub. No.: WO2022/048784
PCT Pub. Date: Mar. 10, 2022

(65) Prior Publication Data
US 2024/0003174 A1 Jan. 4, 2024

(51) Int. Cl.
*E05F 3/22* (2006.01)
*E05F 15/00* (2015.01)

(52) U.S. Cl.
CPC .............. *E05F 3/227* (2013.01); *E05F 15/00* (2013.01); *E05Y 2201/214* (2013.01); (Continued)

(58) Field of Classification Search
CPC ........... E05F 3/227; E05F 1/006; E05F 15/00; E05Y 2201/214; Y10S 16/43
See application file for complete search history.

(56) References Cited

U.S. PATENT DOCUMENTS

| | | | |
|---|---|---|---|
| 2,035,824 | A | 3/1936 | Moore |
| 4,267,619 | A | 5/1981 | Suska |
| 2014/0260929 | A1 | 9/2014 | Leites et al. |

FOREIGN PATENT DOCUMENTS

| | | | |
|---|---|---|---|
| CN | 1508375 | A | 6/2004 |
| CN | 207144679 | U | 3/2018 |

(Continued)

OTHER PUBLICATIONS

English translation of FR2378163A from WIPO (Year: 1978).*

(Continued)

*Primary Examiner* — Daniel J Troy
*Assistant Examiner* — Susan M. Heschel
(74) *Attorney, Agent, or Firm* — CANTOR COLBURN LLP

(57) ABSTRACT

A linkage for force transmission between a driven axle of a door actuator and an assembly surface, includes a hinge, a fastening arrangement designed for fastening the hinge to the assembly surface, in particular a door, frame or wall, wherein an assembly axis is defined perpendicularly to the assembly surface, and a lever arrangement which is fastened to the hinge so as to be rotatable about a hinge axis perpendicular to the assembly axis and which is designed for rotationally-fixed connection to the driven axle of the door actuator. The linkage is designed to detach through the weight of the door actuator falling down in the event of a fire and/or wherein the linkage includes a thermally activatable trigger element that is designed to detach the linkage in the event of thermal activation triggered by a fire.

11 Claims, 18 Drawing Sheets

(52) U.S. Cl.
CPC ..... *E05Y 2201/626* (2013.01); *E05Y 2600/63* (2013.01); *E05Y 2900/132* (2013.01)

(56) References Cited

FOREIGN PATENT DOCUMENTS

| | | | | | |
|---|---|---|---|---|---|
| DE | 3638208 | A1 | | 5/1988 | |
| DE | 29880074 | U1 | | 4/2000 | |
| DE | 102012103709 | A1 | * | 10/2013 | ............... B21K 1/76 |
| DE | 102017006918 | A1 | | 1/2019 | |
| EP | 0802296 | A2 | | 10/1997 | |
| EP | 3425150 | A1 | | 1/2019 | |
| ES | 2320068 | A1 | | 5/2009 | |
| FR | 2378163 | A | * | 8/1978 | |
| FR | 2378163 | A1 | | 8/1978 | |
| WO | 2013159859 | A1 | | 10/2013 | |
| WO | 2017020453 | A1 | | 2/2017 | |

OTHER PUBLICATIONS

DE_102012103709 English translation from WIPO (Year: 2013).*
International Search Report for International Application No. PCT/EP2020/074972, mailed Aug. 26, 2021, 9 pages.
United Kingdom Office Action for Application No. 2302549.7, dated Jan. 2, 2025, 5 pages.
United Kingdom Office Action for Application No. 2414145.9, dated Feb. 6, 2025, 7 pages.

* cited by examiner

LINKAGE FOR A DOOR ACTUATOR

CROSS-REFERENCE TO RELATED APPLICATIONS

This application is a 35 U.S.C. § 371 National Stage patent application of PCT/EP2020/074972 filed 7 Sep. 2020, the disclosure of which is incorporated herein by reference in its entirety.

TECHNICAL FIELD

The disclosure relates to a linkage for force transmission between a driven axle of a door actuator and an associated assembly surface. Furthermore, the disclosure shows an arrangement of the linkage with a door actuator.

BACKGROUND

Door actuators are used to close and/or open doors. In particular, door closers and door drives are designated as door actuators. In the case of the door closer, a spring storage mechanism is generally loaded by the manual opening movement. The energy stored in this case is used to close the door. In the case of the door drive, the door can be opened and/or closed automatically for example by means of electromechanics or hydraulics. Door actuators are usually fastened on the door leaf or the frame or wall.

Door actuators are commonly used in conjunction with a linkage. The linkage serves to transmit a force from the driven axle of the door actuator to the assembly surface of the linkage. The linkage is usually fastened to the door leaf or the frame or wall. If the door actuator is fastened to the door leaf, for example, the linkage is fastened to the frame or wall and vice versa.

In particular in the case of fire protection doors, it must be noted that flammable fluids, in particular hydraulic oils, are often used in the door actuators. Suitable measures are used to as far as possible prevent the fluid in the door actuator from heating excessively and possibly igniting during a fire. For this purpose, it is provided, for example, that a door actuator is fastened to its assembly surface with fusible screws. If these fusible screws heat up in the event of a fire, the door actuator can fall off its assembly surface.

SUMMARY

The present disclosure indicates a linkage for a door actuator, which enables a door to be used in an operationally-safe manner and at the same time meets all security-related requirements, in particular for the event of a fire.

It has been recognized that it is not sufficient in all applications if only the door actuator detaches from its assembly surface in the event of a fire and it falls down. In general, the door actuator then continues to hang on its linkage and may therefore be too close to the door that is heating up.

The linkage presented below provides a remedy here, as it allows the door actuator to fall down completely in the event of a fire.

The linkage is provided for force transmission between a driven axle of the door actuator and the assembly surface of the linkage. The driven axle of the door actuator is in particular a rotatable shaft provided on or in the door actuator. The assembly surface is in particular a door leaf or a frame or wall. Perpendicular to this assembly surface, an assembly axis is defined. The assembly axis is usually horizontal and perpendicular to the frame or wall or perpendicular to the door leaf.

The linkage comprises a hinge and a fastening arrangement. The fastening arrangement is designed to fasten the hinge to the assembly surface. In a simple configuration, the fastening arrangement comprises one or a plurality of screws that run parallel to the assembly axis in order to screw the hinge to the assembly surface.

The hinge preferably comprises at least one hinge base plate which is aligned substantially perpendicular to the assembly axis and bears against the assembly surface directly or with corresponding intermediate elements. At least one hinge leg preferably extends from this hinge base plate. Two parallel hinge legs spaced apart from one another are particularly preferably provided. The at least one hinge leg preferably holds a hinge pin. The hinge pin preferably extends vertically and defines a hinge axis.

Furthermore, a lever arrangement is provided in the linkage. The lever arrangement is fastened to the hinge, in particular to the hinge pin, so as to be rotatable about the hinge axis perpendicular to the assembly axis. Furthermore, the lever arrangement is designed for rotationally-fixed connection to the driven axle of the door actuator.

The lever arrangement is preferably a scissor linkage. This scissor linkage comprises a first lever which is connected directly or indirectly to the hinge and a second lever which, in particular via a lever eye, is connected in a rotationally fixed manner to the driven axle of the door actuator. The two levers are connected to one another via a joint, in particular via a ball joint.

Particularly preferably, the first lever comprises two elements whose length can be adjusted one into the other, for example designated as a tensioning screw and a tensioning nut. The tensioning screw comprises in particular a threaded rod. The tensioning nut is preferably an elongated lever-like element with an internal thread on one side for screwing in the tensioning nut.

Furthermore, it is preferably provided that the lever arrangement comprises a connecting element. The connecting element is preferably connected to the first lever, in particular the tensioning screw, via a swivel joint. The swivel joint preferably has a swivel joint pin defining a swivel joint axis. The swivel joint pin can also be formed by two coaxial pin elements. The swivel joint axis is preferably horizontal and/or perpendicular to the hinge axis. The connecting element is preferably rotatably connected to the hinge. In particular, the hinge pin runs through the connecting element.

It is preferably provided that the linkage is designed to detach through the weight of the door actuator falling down in the event of a fire. As described, the linkage is used in conjunction with a door actuator. The door actuator is preferably fastened to its assembly surface in such manner that it falls off in the event of a fire. This is possible, for example, by the door actuator being fastened with fusible screws; but other variants are also possible, in which, for example, the door actuator is pushed away from its assembly surface by thermally intumescent material, in order to detach the door actuator at the corresponding temperature. The linkage is preferably designed such that the weight of the door actuator is sufficient to detach the linkage. Detaching the linkage is understood as the linkage detaching at some point, for example at a swivel joint, at the hinge or at the fastening arrangement such that the door actuator can fall down completely. The weight of conventional door closers is in the range of 1 kg to 5 kg and is sufficient, taking into account the corresponding lever force, to detach the linkage as desired. Door drives usually weigh considerably more, around 10 kg to 30 kg.

Additionally or alternatively to detaching the linkage through the weight of the door actuator falling down in the event of a fire, it is preferably provided that the linkage comprises at least one thermally activatable trigger element. This thermally activatable trigger element is designed to detach the linkage in the event of thermal activation triggered by a fire. In this variant, not only is the door actuator detached from its assembly surface via a thermally activatable element, for example the fusible screws, but at the same time the region of the linkage, in particular in the region of the fastening arrangement or the hinge, is heated and thus the trigger element is thermally activated. Variants and configurations for the trigger element will be described in detail later.

It is also provided to combine the two variants in a linkage such that the linkage is simultaneously designed to detach through the weight of the falling door actuator and also comprises a thermally activatable trigger element for detaching the linkage.

It is preferably provided that a securing element is provided on the swivel joint or the hinge. The securing element is designed and arranged such that it holds the swivel joint or hinge together. The securing element is designed in particular as a securing sleeve, securing tab, securing splint or securing screw. As a result of the first lever being lowered, the securing element can be moved into a position which no longer holds the swivel joint or hinge together. This movement, i.e. the lowering of the first lever, takes place when the door actuator detaches from its assembly surface and pulls the lever arrangement downwards through its weight. This movement with the first lever being lowered is used to move the securing element into its position which does not hold the swivel joint or hinge together.

The securing element as a securing sleeve is placed in particular on the swivel joint and encloses the swivel joint, wherein the swivel joint detaches by removing the securing sleeve.

The securing element as a securing tab is placed in particular on or at the hinge pin or swivel joint pin. In particular, the securing tab has a U-shaped receptacle which is placed onto a groove of the corresponding pin. The securing tab thus acts on the outside of the pin and prevents it from detaching from the hinge or swivel joint.

A similar function is fulfilled by the securing splint, which does not act on the outside of the pin, but is inserted through a hole in the pin.

When the securing element is configured as a securing screw, an element of the hinge or swivel joint, in particular the pin, is held in its position by means of the securing screw, wherein it is provided in particular that the securing screw is destroyed in order to detach the hinge or swivel joint. The securing screw itself can be destroyed or torn out of its thread.

As already described, it is preferably provided that the lever is connected to the connecting element via the swivel joint axis. The essential part of the first lever extends from this axis of rotation to the ball joint and thus to the connection with the second lever. However, it is preferably provided that a small part of the first lever protrudes beyond the swivel joint axis in the direction of the hinge. This protruding portion is referred to as the actuating section. When the lever arrangement is lowered, in particular when the second lever of the ball joint and the first lever are lowered, the first lever rotates about the swivel joint axis. As a result, the actuating section rises. The actuating section and the securing element are preferably arranged and designed such that the securing element is moved into the position which does not hold the hinge or swivel joint together by the actuating section moving upwards.

As mentioned, it is preferably provided that the securing element is designed as a securing sleeve which sits on the swivel joint. It is preferably provided that the swivel joint comprises a U-shaped, downwardly open first pin receptacle. This first pin receptacle is formed on the connecting element and/or on the first lever. The swivel joint pin inserts in this first pin receptacle during normal use of the linkage. The securing sleeve has a second pin receptacle. The second pin receptacle of the securing sleeve is also U-shaped and open at the side such that the securing sleeve placed onto the swivel joint and thus also the swivel joint pin holds the swivel joint pin in its desired position, namely in the first pin receptacle. As soon as the securing sleeve is removed, in particular pushed off, from the swivel joint, in particular by the actuating section of the first lever being raised, the swivel joint detaches since the swivel joint pin can be moved downwards out of the first pin receptacle.

Preferably, a fixing element is provided on the securing sleeve to prevent accidental removal of the securing sleeve during normal use of the linkage. The fixing element is, for example, a plastic screw with which the securing tab is screwed to the connecting element or to the first lever. This plastic screw tears off when the securing tab is removed through the actuating section. It is also possible for at least one projection to extend horizontally from the first lever as a fixing element. This fixing element, designed as a projection, prevents a movement of the securing tab as long as the first lever is in its normal horizontal position. When the first lever is lowered, the fixing element then also moves downwards and frees the movement path for the securing tab.

In an alternative configuration, it is provided that a securing element on the hinge, in particular a hinge pin, is detached by the first lever being lowered and the actuating section thereby moving upwards.

As mentioned at the outset, the hinge has one or two hinge legs which extend from the hinge base plate and in which the hinge pin is received. In order to allow easy detachment of the hinge, for example detachment of the connecting element from the hinge pin or the hinge pin falling out, it is preferably provided that only one hinge leg is used instead of the two hinge legs spaced apart from one another. This one hinge leg is located either on the upper side, i.e. above the connecting element, or on the underside, i.e. below the connecting element.

The securing element, in particular as a securing tab or securing splint, is preferably arranged and designed such that it can be pulled off the hinge pin by the actuating section. In particular, this means that the hinge pin, which is only secured by the securing element, falls out of the hinge downwards, as a result of which the connecting element and thus the entire lever arrangement detaches from the hinge. Alternatively, the connecting element can also detach from the hinge pin.

Furthermore, it is provided that when a hinge leg is arranged above the connecting element, the hinge pin is fastened to the hinge leg from above with a locking screw that is set coaxially in the hinge pin. The actuating section is arranged and designed such that it deforms the hinge leg upwards, as a result of which the securing screw tears off or is torn out of its thread. This also makes it possible for the securing pin to detach from the hinge. It goes without saying that the securing screw is selected corresponding to material and strength such that it detaches under the usual weight of the falling door actuator.

Additionally or alternatively to detaching the linkage on the swivel joint or on the hinge, it is preferably provided that the ball joint, which connects the two levers to one another, is designed to detach through the weight of the falling door actuator. In particular, the first lever and the second lever each have an overhang with which the respective lever protrudes beyond the ball joint. When the door actuator falls down, the second lever with the door actuator first lowers, causing the two levers to rotate relative to one another on the ball joint and causing the two overhangs to come into contact. The ball joint is preferably designed to be so unstable that it detaches through the forces that occur, for example the ball element slides out of its associated socket. A vertical adjusting screw can preferably be provided in the first or second lever in the region of the two overhangs, which predefines the distance between the two overhangs.

As described above, the linkage can comprise at least one thermally activatable trigger element. This is preferably provided in the region of the fastening arrangement such that when thermally activated, the fastening arrangement detaches and the hinge therefore detaches from its assembly surface. In particular in the region of the fastening arrangement, the thermally activatable trigger element can be positioned as close as possible to the assembly surface, preferably directly in contact with the assembly surface such that this trigger element heats up quickly in the event of a fire.

Of course, it must always be assumed that the linkage and the door actuator are on the side of the door away from the fire. The fire first heats up the frame and the door leaf and, as a result, the assembly surface of the linkage and door actuator facing away from the fire.

The trigger element can be thermally activated; in particular in a temperature range from 90° C. to 200° C. “Activating the trigger element” is equivalent to “triggering the trigger element”. For example, the trigger element is an ampoule, in particular a glass ampoule filled with fluid, as is known, for example, from sprinkler systems. The trigger element is designed such that it triggers at the corresponding temperature that is appropriate to avoid ignition of the fluid in the door actuator.

Furthermore, the trigger element can be designed as a fusible element. The fusible element is in particular made of plastic. The fusible element is also designed such that it preferably “triggers” at the temperature described above and is therefore plastically deformed.

Furthermore, the trigger element can be made of thermally intumescent material, which preferably undergoes an increase in volume at the temperature described above.

Furthermore, it is provided that the trigger element is made of a shape-memory material, for example a shape-memory spring, wherein the trigger element preferably changes its shape, for example contracting, expanding or bending, as a result of the temperature described above.

In principle, it is therefore provided that the trigger element can be destroyed and/or deformed and/or melted upon thermal loading or thermal activation.

It is preferably provided that the fastening arrangement comprises a hinge support. This hinge support is fastened to the assembly surface, for example with corresponding screws. When the linkage is detached, in particular when the fastening arrangement is detached, the hinge falls off the hinge support.

At least one blocking element is preferably provided, which can be moved from a retaining position into a release position. The blocking element is preferably movably fastened to the hinge support or the hinge bracket, i.e. either to the hinge base plate or to the hinge leg.

In its retaining position, the blocking element is designed to hold the hinge on the hinge support. In its release position, the blocking element releases the hinge such that it can detach from the hinge support. When it is thermally activated, the trigger element can directly generate a movement of the blocking element into the release position. This is possible, for example, if the trigger element is designed as a thermally intumescent material that can exert a force on the blocking element due to its increase in volume. Alternatively, it is also provided that the trigger element releases or allows a movement of the blocking element into its release position when it is thermally activated. The force required for the movement is then applied in some other way, for example by a pretensioned spring or by the weight of the linkage or door actuator.

It is preferably provided that the hinge, in particular with its hinge base plate, is inserted on one side under a holder of the hinge support. On the opposing side, the hinge is fixed by the blocking element. When the blocking element is moved into the release position, there is thus no need for fixing on one side, as a result of which the hinge folds away from the hinge support and is also detached from the holder.

In particular, it is provided for this purpose that the blocking element is designed as a rotatably mounted swivel bolt. The swivel bolt is in particular rotatably mounted about a swivel bolt axis of rotation. In particular, the swivel bolt is rotatably mounted on the hinge support. The swivel bolt axis of rotation is preferably parallel to the hinge axis.

The swivel bolt preferably comprises two legs. The swivel bolt axis of rotation is preferably arranged between the two legs. One leg holds the hinge and the trigger element acts directly or indirectly on the other leg in order to block the rotary movement of the swivel bolt. So as long as the trigger element does not trigger, the rotary movement of the swivel bolt is blocked and the swivel bolt is in the retaining position.

The trigger element is arranged in particular such that it is exposed on the rear side of the hinge support facing the assembly surface such that it is in direct contact with the assembly surface. For this purpose, the trigger element is preferably fixed to the hinge support by means of a latch connection such that it cannot fall out on the rear side of the hinge support before assembly.

In particular, when using the swivel bolt, it is provided that the trigger element is designed as a fusible element. As soon as the fusible element is deformed by the thermal activation, a swivel movement of the swivel bolt is possible: The weight acting on the hinge (due to the weight of the linkage and/or door actuator) creates a force on the first leg of the swivel bolt and thus a torque about the swivel bolt axis of rotation, wherein the movement of the second leg is no longer blocked by the deforming fusible element. This moves the swivel bolt to the release position.

Alternatively, it is also possible to use at least one ampoule as the trigger element, which, like the fusible element, acts directly or indirectly on the second leg and thereby prevents a rotary movement of the swivel bolt. Thermal activation and thus destruction of the at least one ampoule eliminates this blocking of the rotary movement of the swivel bolt.

Alternatively to the swivel bolt, the blocking element is designed as a linearly displaceable bolt. In particular, the linearly displaceable bolt is displaced in a plane perpendicular to the assembly axis, for example perpendicular to the swivel axis. When thermally activated, the trigger element can move the bolt into the release position, i.e., for example, push or pull it, or release a spring-loaded bolt to move into the release position. For example, with thermally intumescent material, it is possible to press the bolt into its release position. For example, by means of a fusible element or an ampoule, it is possible to release a pretensioned spring in order to thereby move the bolt by means of the spring force.

Also when using the displaceable bolt, it is preferably provided that the hinge is inserted under the holder of the hinge support on one side and is held on the opposing side by means of the bolt.

In further variants, it is also possible for a plurality of blocking elements to be provided, which fasten the hinge at a plurality of points with respect to the hinge support. By detaching this plurality of blocking elements or by moving this plurality of blocking elements into the release positions, it is possible to detach the hinge from the hinge support.

In particular, the individual blocking elements are designed as pin elements. These pin members extend through the hinge and hinge support, thus holding the hinge and hinge support together. For example, the hinge support is U-shaped with two opposing legs. The hinge, in particular the hinge bracket, is inserted between these two opposing legs. The connection between the hinge support and the hinge is made by vertical pin elements. In particular, the blocking elements designed as pin elements can be moved parallel to the hinge axis into their release position.

In further variants, it is provided that the fastening arrangement comprises one or a plurality of screws with which the hinge is fastened to the assembly surface, wherein the screw head contact or the recesses, in particular holes, are variable in size such that, when thermally activated, the screw heads can fit through their recesses and the hinge can thus detach from the screws of the fastening arrangement.

To detach the hinge from the fastening screws, it is preferably provided that the trigger element is designed as a fusible element. The fusible element has a first recess for the fastening element, in particular the screw. The hinge, in particular the hinge base plate of the hinge bracket, has a second recess for the same screw. The two recesses are aligned. In the normal fastened state, the screw extends through both recesses. The screw head rests against the fusible element. In this case, the fusible element can extend through the second recess such that it is in direct contact with the assembly surface. The second recess has a larger diameter than the first recess. In particular, the diameter of the second recess is larger than the diameter of the screw head. After melting or deforming of the fusible element, the head is no longer held by the fusible element such that the head moves through the second recess.

Alternatively to the fusible element, a trigger element with thermally intumescent material can also be used here in combination with a retaining element. The thermally intumescent material is arranged to displace the retaining element when thermally activated. The retaining element has the first recess for the screw. In the fastened state, the screw head is thus in contact with the retaining element. The hinge, in particular the hinge base plate, has the second recess, which is aligned with the first recess. The diameter of the second recess is in turn larger than that of the first recess and in particular larger than the screw head. Thermal activation and the resulting displacement of the retaining element causes the retaining element or the first recess to be pushed or pulled out from under the screw head such that the screw head can move through the second recess, causing the hinge to detach from the at least one screw.

In particular, the retaining element is an angled element. The at least one first recess is provided on a leg of the retaining element. The intumescent material acts on the other leg of the retaining element and is thus supported in particular against the second leg and the hinge. When thermally activated, the thermally intumescent material pushes the retaining element away from the hinge, in particular from one of the two hinge legs.

In combination with the retaining element, it is preferably provided that at least one fusible element, for example as an intermediate plate, is arranged between the hinge and the assembly surface. This intermediate plate deforms when heated and thus reduces the pretension of the screws, which allows easy movement of the retaining element.

A further variant for detaching the fastening arrangement provides that the trigger element is positioned as a thermally intumescent material for arrangement between the hinge and the assembly surface. For this purpose, the trigger element or the plurality of trigger elements can be positioned on the rear side of the hinge base plate. Furthermore, it is also possible to use an assembly bracket between the hinge and the assembly surface, in which the thermally intumescent material is arranged. When thermally activated, the thermally intumescent material expands and thus pushes the hinge away from the assembly surface, which destroys a fastening, for example a screw connection, and thus detaches the hinge from the assembly surface. When using the assembly bracket, all or part of the assembly bracket may detach from the assembly surface together with the hinge. Alternatively, the assembly bracket can also be designed such that the assembly bracket remains completely on the assembly surface and the thermally intumescent material pushes the hinge away from the assembly bracket.

Additionally or alternatively to detaching the fastening arrangement with a thermally activatable trigger element and/or additionally or alternatively to detaching the linkage through the weight of the door actuator, it is preferably provided that the hinge, i.e. the connection between the hinge bracket and the connecting element, can be detached by a thermally activatable trigger element.

In particular, it is provided here that a securing element is provided on the hinge. In this variant, this securing element is designed in particular as a securing tab or securing splint. In particular, the securing element ensures that the connecting element is detached from the hinge pin in the event of a falling lever arrangement. Accordingly, it is preferably provided that the hinge has a hinge leg only on the upper side of the connecting element such that the connecting element can slide downwards off the hinge pin. During normal use, the connecting element is secured against falling by the securing element. Regardless of whether one or two hinge legs are used, the hinge pin can be secured against falling out with the securing element. In both variants, the hinge can be detached by removing the securing element; either by the connecting element falling off the hinge pin or by detaching the hinge pin from at least one hinge leg.

The thermally activatable trigger element is designed to pull off the securing element itself upon thermal activation or to release a spring force for removing the securing element. For example, the trigger element, as an ampoule, can block a pretensioned tension or compression spring, wherein the spring pulls off the securing element after the ampoule has been destroyed.

Furthermore, it is preferably provided that the trigger element consists of shape-memory material, for example designed as a shape-memory spring. This shape-memory spring can contract when thermally activated and thereby pull the securing element.

The disclosure also comprises an arrangement. The arrangement comprises the linkage described and a door actuator. The door actuator is in particular a door closer or door drive. The linkage is connected in particular to the driven axle of the door actuator. The door actuator or an assembly bracket on the door actuator are designed to detach the door actuator from its assembly surface in the event of thermal activation triggered in the event of a fire. For this purpose, for example, the fusible screws described above can be used for fastening the door actuator. However, the assembly bracket described with thermally intumescent material can also be used in the region of the door actuator in order to push the door actuator away from its assembly surface in the event of a fire and thus detach it. The door actuator weighs in particular from 1 kg to 30 kg and can therefore, as described above, detach the linkage with its weight.

BRIEF DESCRIPTION OF THE DRAWINGS

The disclosure will now be described further on the basis of exemplary embodiments, in which is shown.

DETAILED DESCRIPTION OF THE DRAWINGS

Figure 1:
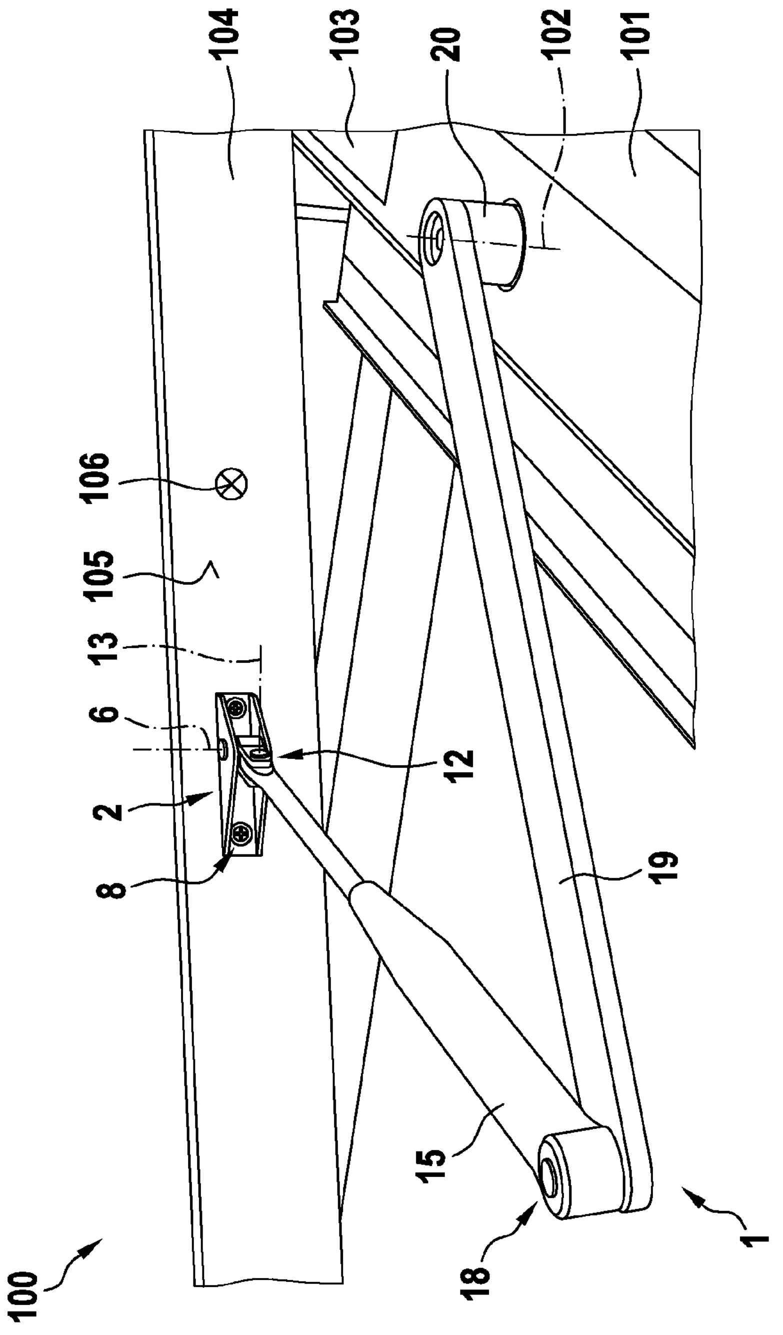
FIG. 1 an arrangement according to the disclosure with linkage and door actuator according to the disclosure for all exemplary embodiments, FIGS. 2 to 6 a linkage according to the disclosure in accordance with a first exemplary embodiment, FIGS. 7 to 9 the linkage according to the disclosure in accordance with a second exemplary embodiment, FIG. 10 the linkage according to the disclosure in accordance with a third exemplary embodiment, FIGS. 11 to 13 the linkage according to the disclosure in accordance with a fourth exemplary embodiment, FIG. 14 the linkage according to the disclosure in accordance with a fifth exemplary embodiment, FIGS. 15 to 16 the linkage according to the disclosure in accordance with a sixth exemplary embodiment, FIGS. 17 to 18 the linkage according to the disclosure in accordance with a seventh exemplary embodiment, FIGS. 19 to 20 the linkage according to the disclosure in accordance with an eighth exemplary embodiment, FIGS. 21 to 23 the linkage according to the disclosure in accordance with a ninth exemplary embodiment, FIG. 24 the linkage according to the disclosure in accordance with a tenth exemplary embodiment, FIGS. 25 to 26 the linkage according to the disclosure in accordance with an eleventh exemplary embodiment, FIG. 27 the linkage according to the disclosure in accordance with a twelfth exemplary embodiment, FIG. 28 the linkage according to the disclosure in accordance with a thirteenth exemplary embodiment, FIGS. 29 to 30 the linkage according to the disclosure in accordance with a fourteenth exemplary embodiment, FIG. 31 the linkage according to the disclosure in accordance with a fifteenth exemplary embodiment, FIG. 32 the linkage according to the disclosure in accordance with a sixteenth exemplary embodiment, and FIGS. 33 to 34 the linkage according to the disclosure in accordance with a seventeenth exemplary embodiment.
Figure 2:
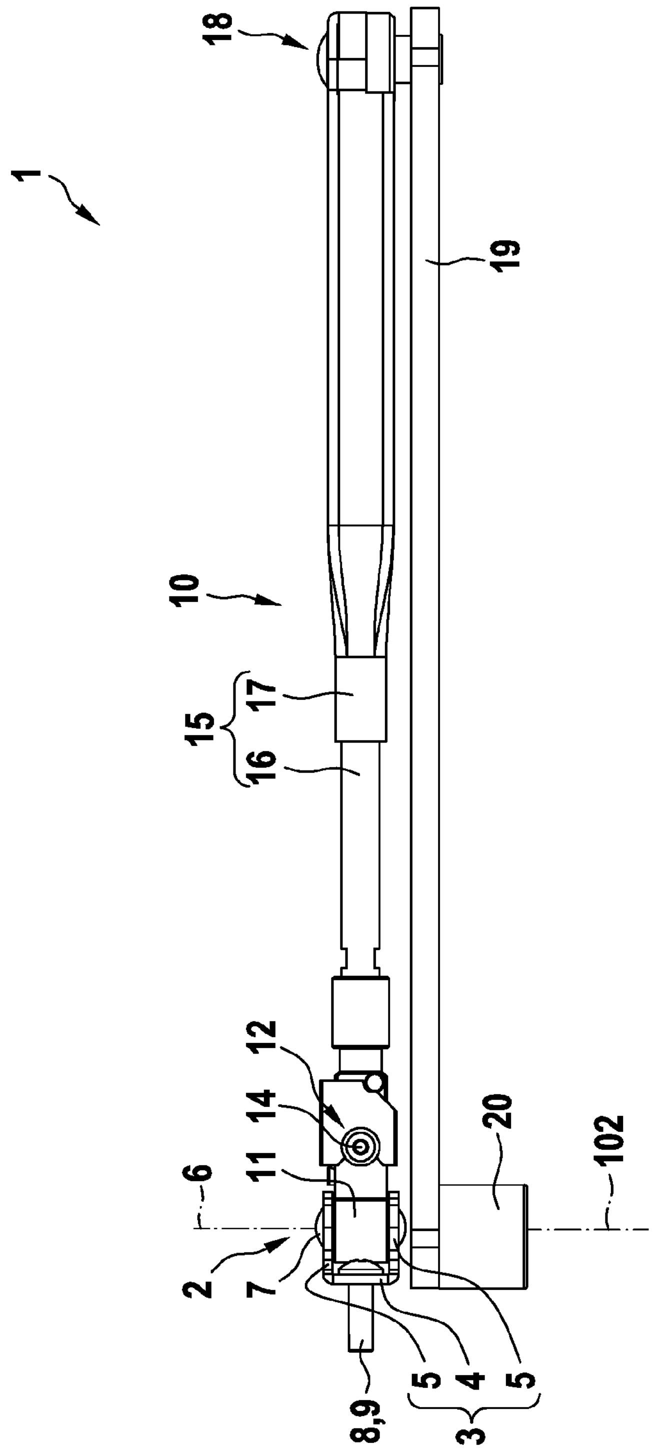
Figure 3:
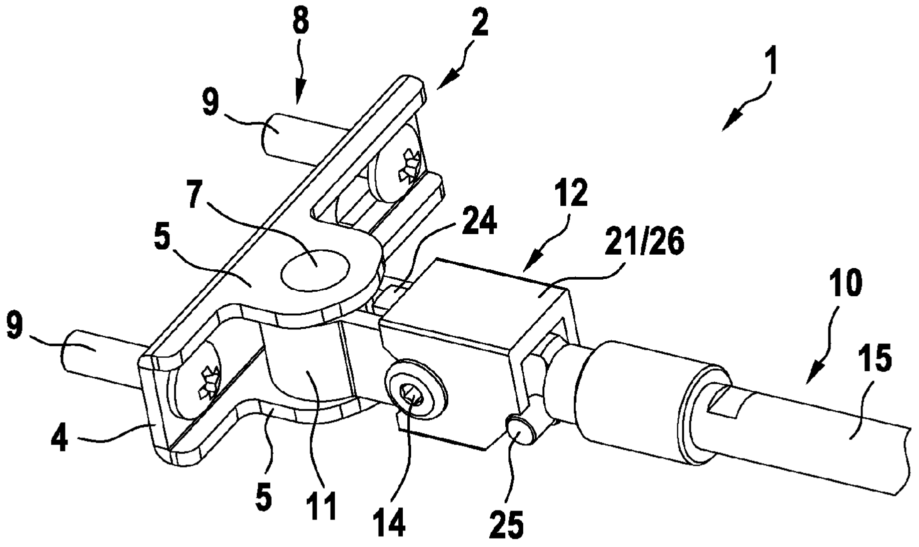

A plurality of exemplary embodiments of a linkage 1 for force transmission between a driven axle 102 of a door actuator 101 and an assembly surface 105 are described in detail below. Identical or functionally identical parts are provided with the same reference numerals.

Figure 32:
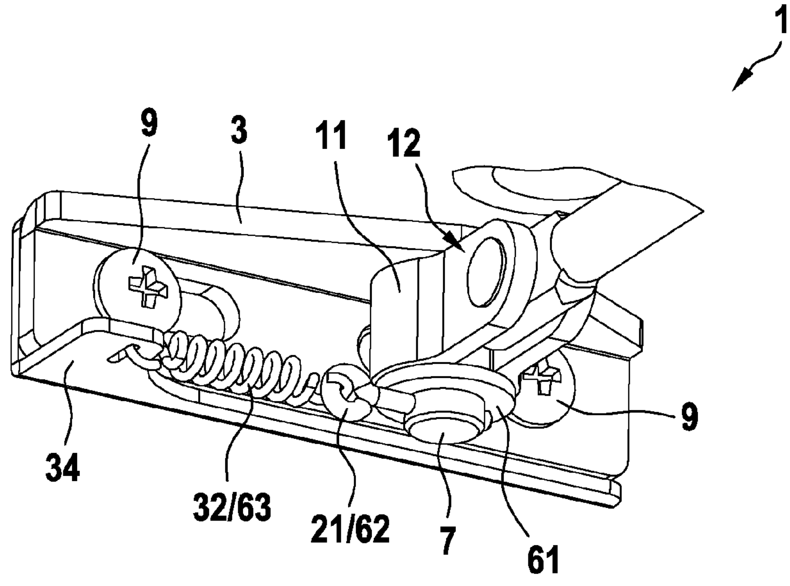
Figure 33:
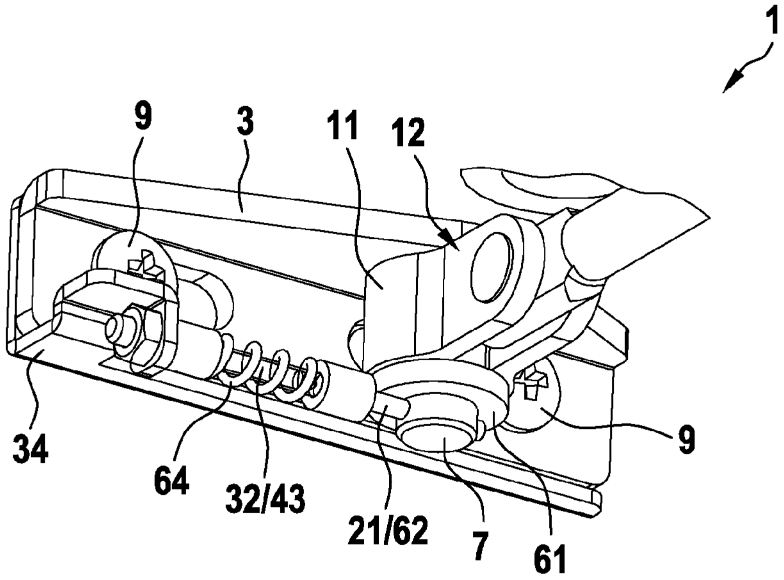
Figure 34:
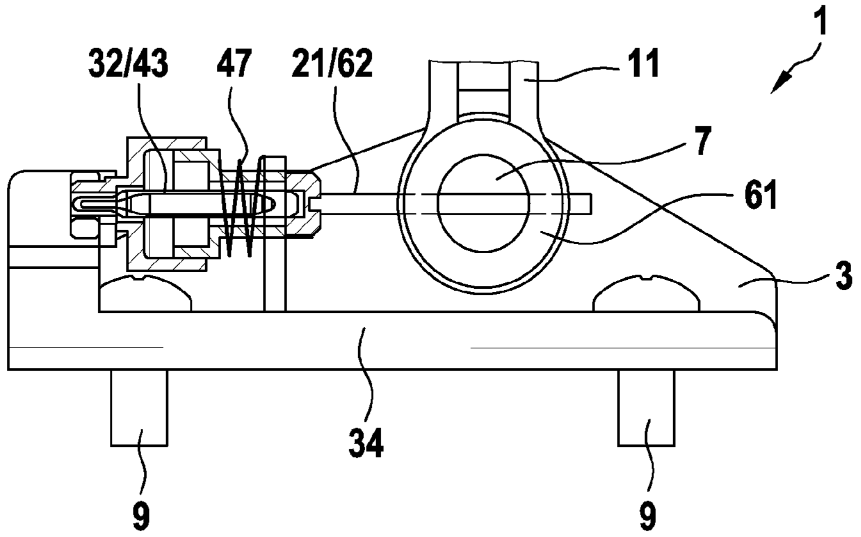

The exemplary embodiments 1 to 3 with FIGS. 2 to 10 show variants for detaching the linkage 1 through the weight of a falling door actuator 101. The exemplary embodiments 4 to 15 with FIGS. 11 to 31 show variants for detaching the linkage with a thermally activatable trigger element 32 in the region of a fastening arrangement 8. The exemplary embodiments 16 and 17 with FIGS. 32 to 34 show variants for detaching the linkage with a thermally intumescent trigger element 32 on a hinge 2.

FIG. 1 shows an arrangement 100 with the door actuator 101 and the linkage 1 for all exemplary embodiments. FIG. 1 also shows a door leaf 103 to which the door actuator 101 is fastened. The door leaf 103 is rotatably mounted in a door frame 104. On the door frame 104, which forms the assembly surface 105, the linkage 1 is mounted with its hinge 2 via the fastening arrangement 8. Perpendicular to this assembly surface 105, an assembly axis 106 is defined.

As shown in FIG. 1 and the figures for the individual exemplary embodiments, the linkage 1 is designed as follows:

The linkage 1 comprises the hinge 2. The hinge 2 in turn has a hinge bracket 3. The hinge bracket 3 has a hinge base plate 4. The hinge base plate 4 is in particular perpendicular to the assembly axis 106. Furthermore, the hinge bracket 3 can have one or two hinge legs 5 which extend perpendicularly from the hinge base plate 4. A hinge pin 7, which defines a hinge axis 6, is received on the at least one hinge leg 5. The hinge axis 6 is vertical and perpendicular to the assembly axis 106.

The fastening arrangement 8 is provided for connecting the hinge 2, in particular the hinge bracket 3, to the assembly surface 105. In a simple configuration, the fastening arrangement 8 comprises at least one screw 9 which is firmly screwed into the assembly surface 5.

Furthermore, the linkage 1 comprises a lever arrangement 10. The linkage 1 is designed here as a scissor linkage such that the lever arrangement 10 comprises a first lever 15 and a second lever 19. The two levers 15, 19 are rotatably connected to one another via a ball joint 18.

The first lever is connected to a connecting element 11 of the lever arrangement 10 via a swivel joint 12. The swivel joint 12 comprises one or a plurality of coaxial swivel joint pins 14 defining a swivel joint axis 13. The swivel joint axis 13 is in particular horizontal and thus perpendicular and offset to the hinge axis 6.

In particular, the connecting element 12 has two parallel tabs, between which the first lever 15 is arranged. The one or plurality of swivel joint pins 14 extend through the two tabs and the first lever 15.

The first lever 15 preferably comprises a tensioning screw 16 in a tensioning nut 17. By screwing the tensioning screw 16 into the tensioning nut 17, the length of the first lever 15 can be adjusted.

The second lever 19 is connected to the driven axle 102 or the associated shaft of the door actuator 101, for example via the lever eye 20 shown, in a rotationally-fixed manner.

In FIG. 1, the door actuator 101 is located on the door leaf 103 and the hinge 2 accordingly on the door frame 104. The reverse arrangement is also possible, where the door actuator 101 is fastened to the door frame 104 and the hinge 2 is fastened to the door leaf 103.

The door actuator 101 is designed and arranged on its assembly surface such that it can be detached from its assembly surface, in the example shown the door leaf 103, in the event of a fire and the associated heating. For example, the door actuator 101 is pushed away from its assembly surface by thermally intumescent material and thereby detaches. This causes the door actuator 101 to fall down.

First exemplary embodiment with FIGS. 2 to 6: The linkage 1 comprises a securing element 21, designed as a securing sleeve 26. The securing sleeve 26 is placed on the swivel joint 12.

Figure 4:
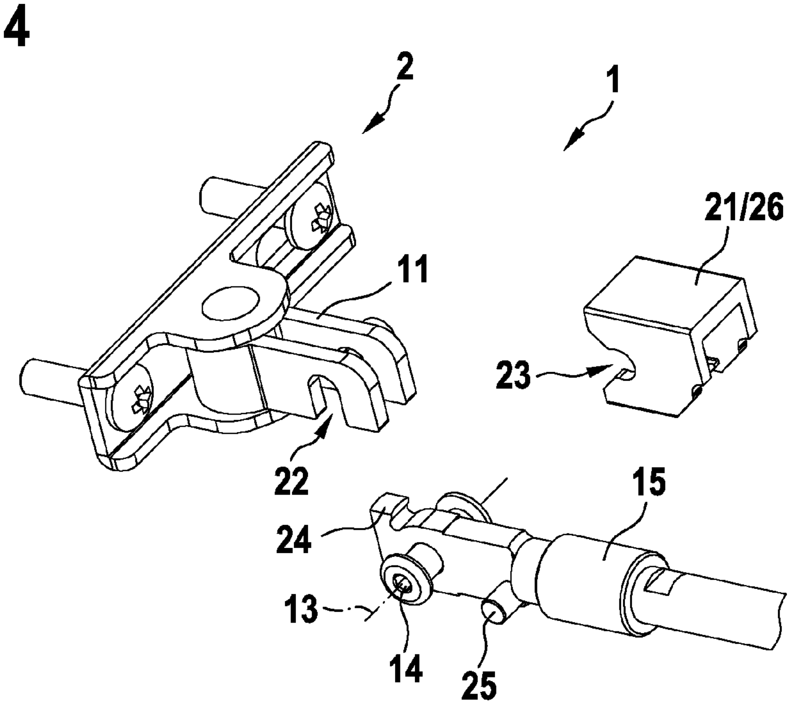

As the exploded illustration in FIG. 4 shows in particular, the connecting element 11 has a first pin receptacle 22. The first pin receptacle 22 is U-shaped and open at the bottom.

The securing sleeve 26 has a second pin receptacle 23. The second pin receptacle is U-shaped and open at the side.

In the assembled state, the first lever 25 is inserted with the swivel joint pin 14 in the first pin receptacle 22. The swivel joint pin 14 is prevented from falling out downwards due to the placement of the securing sleeve 26.

Figure 5:
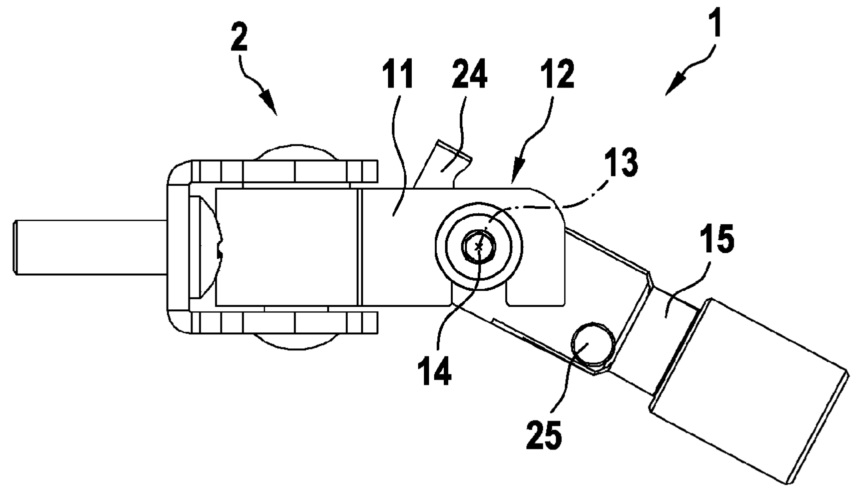

FIG. 5 illustrates for the first and second exemplary embodiment that the first lever 15 comprises an actuating section 24 which protrudes beyond the swivel joint axis 13. When the first lever 15 is lowered by the falling door actuator 101, the actuating section 24 rises.

In the first exemplary embodiment, the securing sleeve 26 is pushed off by the rising actuating section 24 such that the second pin receptacle 23 detaches from the swivel joint pin 14.

FIGS. 4 and 5 show a fixing element 25, designed as a projection, which extends horizontally from the first lever 15. In the normal horizontal position of the first lever 15, this fixing element 15 prevents a movement of the securing sleeve 26. Only after lowering the first lever 15 according to FIG. 5 is a movement of the securing sleeve 26 released.

Figure 6:
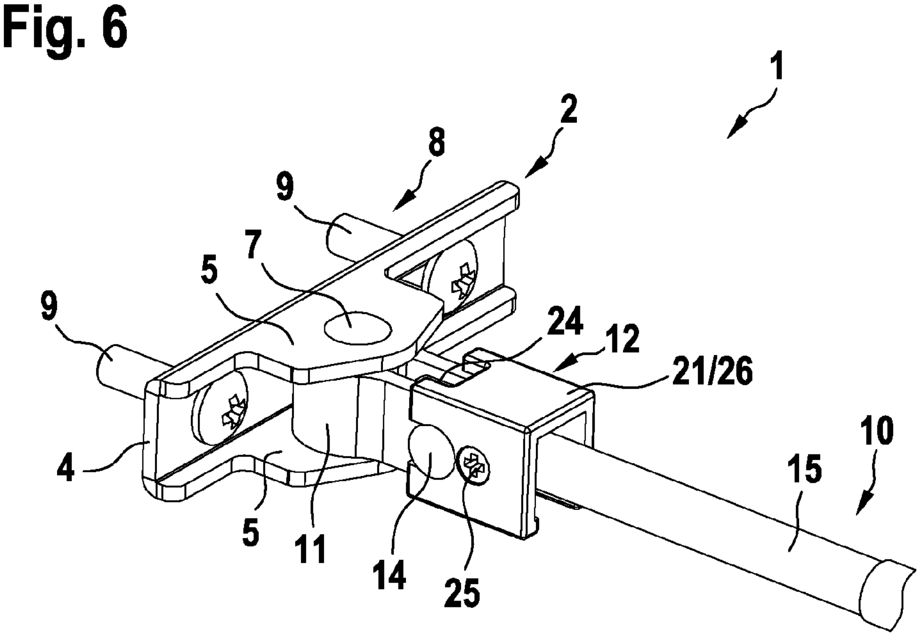

FIG. 6 illustrates that the fixing element 25 can also be designed as a plastic screw, for example, which connects the securing sleeve 26 to the connecting element 11, for example. The screw is designed to be so unstable that it is destroyed when the securing sleeve 26 is displaced by the actuating section 24.

Figure 7:
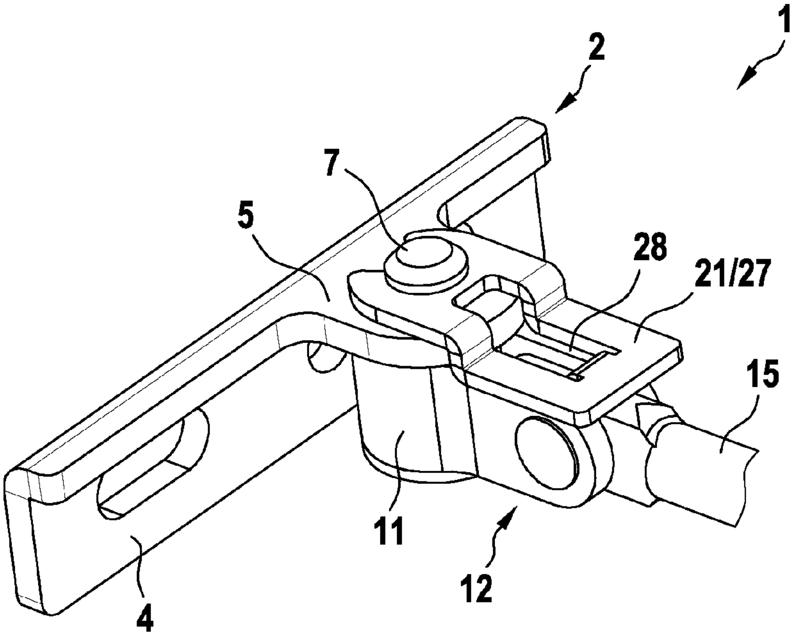
Figure 8:
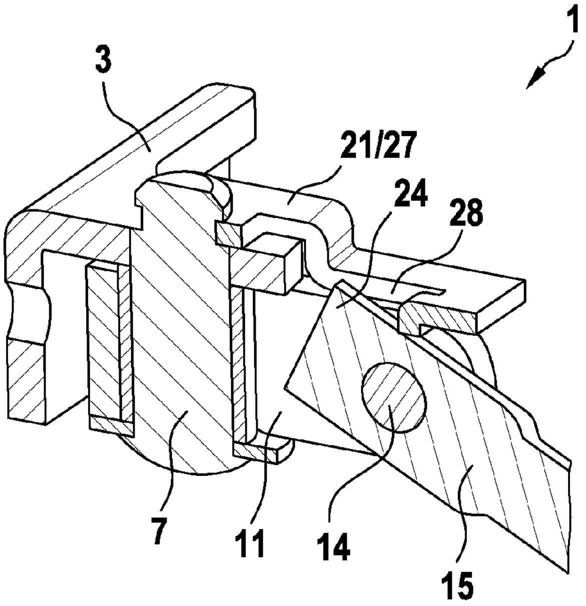
Figure 9:
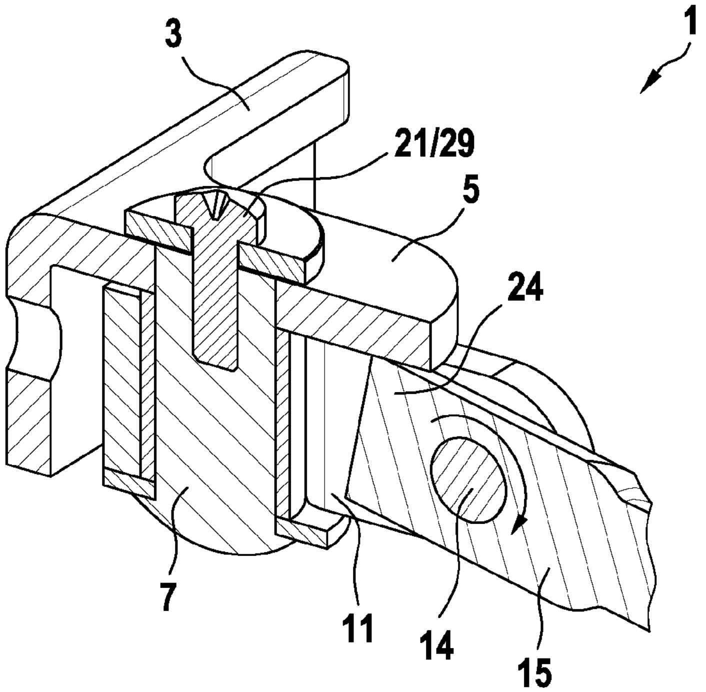

Second exemplary embodiment with FIGS. 7 to 9: In the second exemplary embodiment, the hinge 2 is detached, i.e. in particular the connecting element 11 is detached from the hinge bracket 3. In FIGS. 7 and 8, the securing element is designed as a securing tab 27 for this purpose. The U-shaped recess of the securing tab 27 is inserted in a corresponding groove of the hinge pin 7. In the variant shown in FIGS. 7 and 8, the securing tab 27 holds the hinge pin 7. When the securing tab 27 is pulled off by the actuating section 24, the securing tab 27 detaches from the hinge pin 7 such that the hinge pin 7 together with the connecting element 11 can fall downwards. For this purpose, it is in particular provided that the hinge bracket 3 has a hinge leg 5 only on the upper side.

The securing tab 27 preferably has a tab recess 28 into which the actuating section 24 can dip.

Alternatively to the securing tab 27, a securing splint can also be used here, which is correspondingly configured such that it can be pulled by the actuating section 24.

FIG. 9 shows a variant of the second exemplary embodiment, in which the securing element 21 is designed as a securing screw 29. The securing screw 29 is screwed into the hinge pin 7 coaxially to the hinge axis 6 from above and holds the hinge pin 7 with its head, optionally with a washer, with respect to the upper hinge leg 5. A hinge leg 5 is preferably not provided on the underside here too. The securing screw 29 is correspondingly unstable, for example made of plastic such that the actuating section 24 can lift the hinge leg 5 when the first lever 15 is lowered and can thereby destroy the securing screw 29, for example by tearing off the head of the securing screw 29 or by tearing the securing screw 29 out of its thread. This eliminates the securing of the hinge pin 7 in the hinge bracket 3 and thus the connecting element 11 can fall down together with the hinge pin 7.

Figure 10:
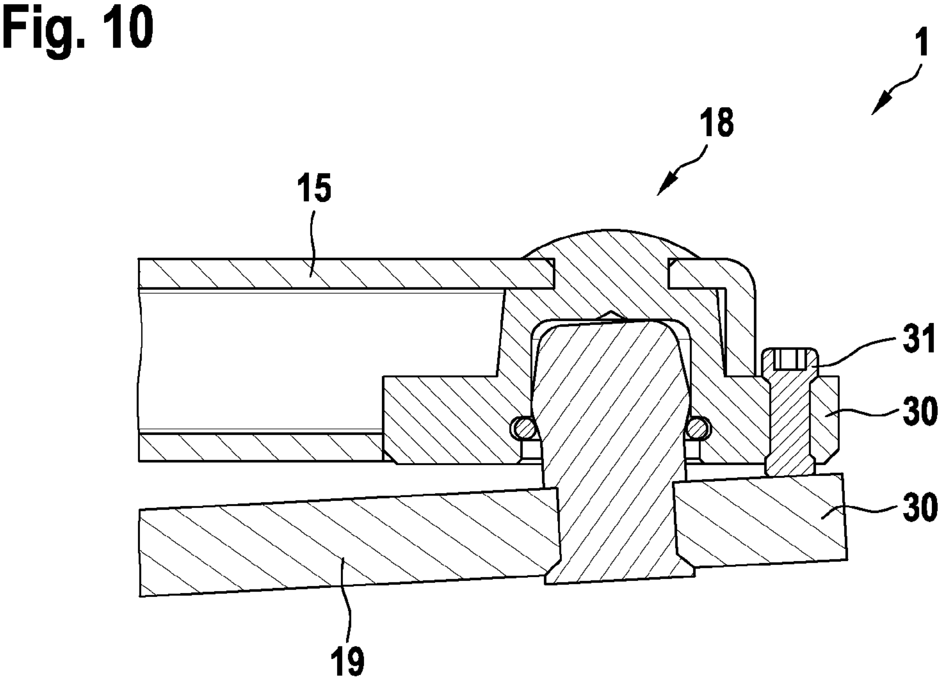

Third exemplary embodiment with FIG. 10: FIG. 10 shows the ball joint 18 for connecting the two levers 15, 19 in a sectioned detail illustration. This ball joint 18 is configured to be unstable in such manner that the ball joint 18 and thus the two levers 15, 19 detach from one another through the weight of the falling door actuator 101. In particular, it is provided that the two levers 15, 19 each have an overhang 30 that protrudes beyond the ball joint 18. The two overhangs 30, possibly with a vertical adjusting screw 31, touch when lowering the door actuator 101 and thus facilitate the detachment of the ball joint 18.

Figure 11:
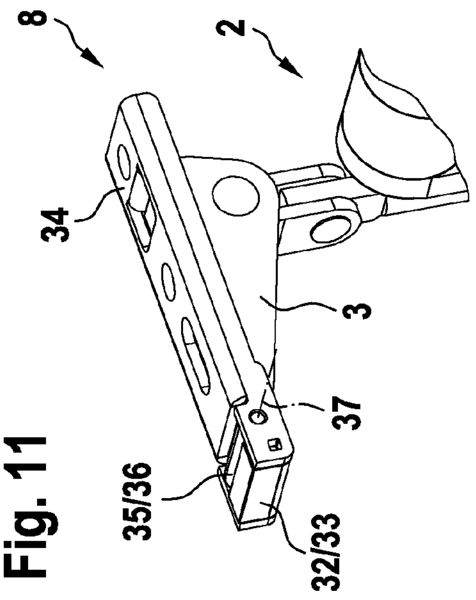
Figure 12:
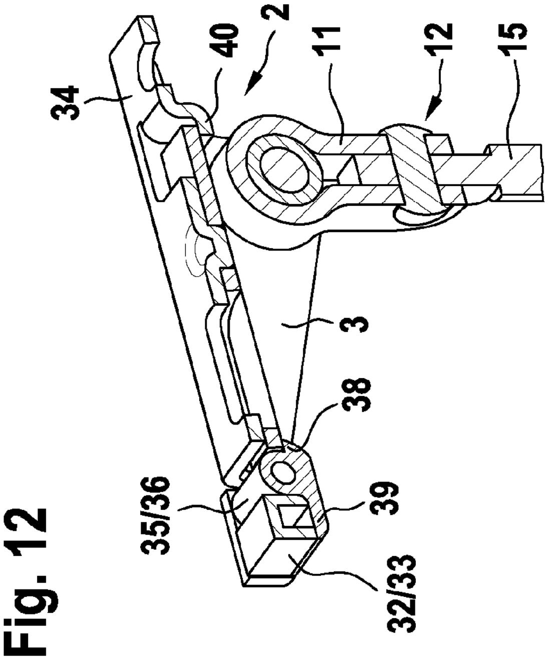
Figure 13:
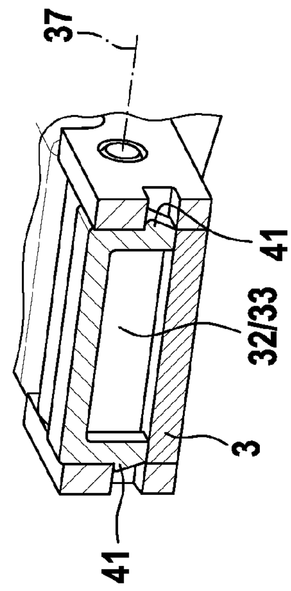

Fourth exemplary embodiment with FIGS. 11 to 13: In the fourth and a plurality of the following exemplary embodiments, the linkage 1 comprises a hinge support 34 as part of the fastening arrangement 8. The hinge support 34 is firmly connected to the assembly surface 105, for example with the screws 9. The hinge 2, in particular the hinge bracket 3, can be detached from the hinge support 34 using at least one thermally activatable trigger element 32.

According to FIGS. 11 to 13, a blocking element 35 is provided, which is designed as a swivel bolt 36 here. The swivel bolt 36 is fastened to the hinge support 34 so as to be rotatable about a swivel bolt axis of rotation 37. The swivel bolt axis of rotation 37 is parallel and offset to the hinge axis 6.

The swivel bolt 36 has a first leg 38 and a second leg 39. The swivel bolt axis of rotation 37 is located between the two legs 38, 39.

The hinge bracket 3, in particular the hinge base plate 4, is pushed under a holder 40 of the hinge support 35 on one side. On the opposing side, the first leg 38 holds the hinge 2 on the hinge support 34.

The swivel bolt 36 is prevented from rotating by the trigger element 32, designed here as a fusible element 33. This fusible element 33 is exposed in particular on the rear side of the hinge support 34 and is therefore in direct contact with the assembly surface 105. As a result, the fusible element 33 is clamped between the assembly surface 105 and the second leg 39 in the assembled state. In order to prevent the fusible element 33 from falling out before assembly, a latch connection 41 is preferably provided between the fusible element 33 and the hinge support 34 according to FIG. 13.

Figure 14:
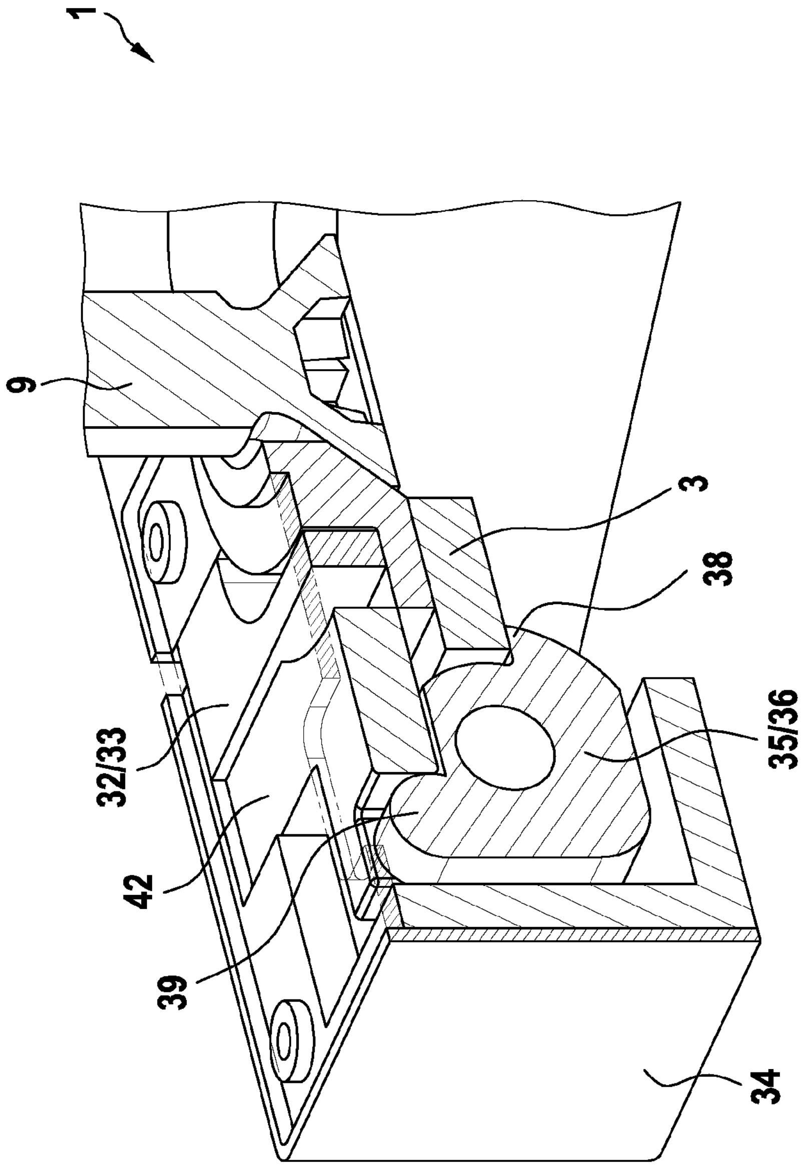

Fifth exemplary embodiment with FIG. 14: According to FIG. 14, the blocking element 35 is also designed as a swivel bolt 36. Here, however, the two legs 38, 39 are arranged such that between the legs 38, 39 there is a deflection of 270°. An intermediate piece 42 is located between the fusible element 33 and the second leg 39. Here, too, after the fusible element 33 has melted, the swivel bolt 36 can be rotated, as a result of which the hinge 2 detaches from the hinge support 34.

Figure 15:
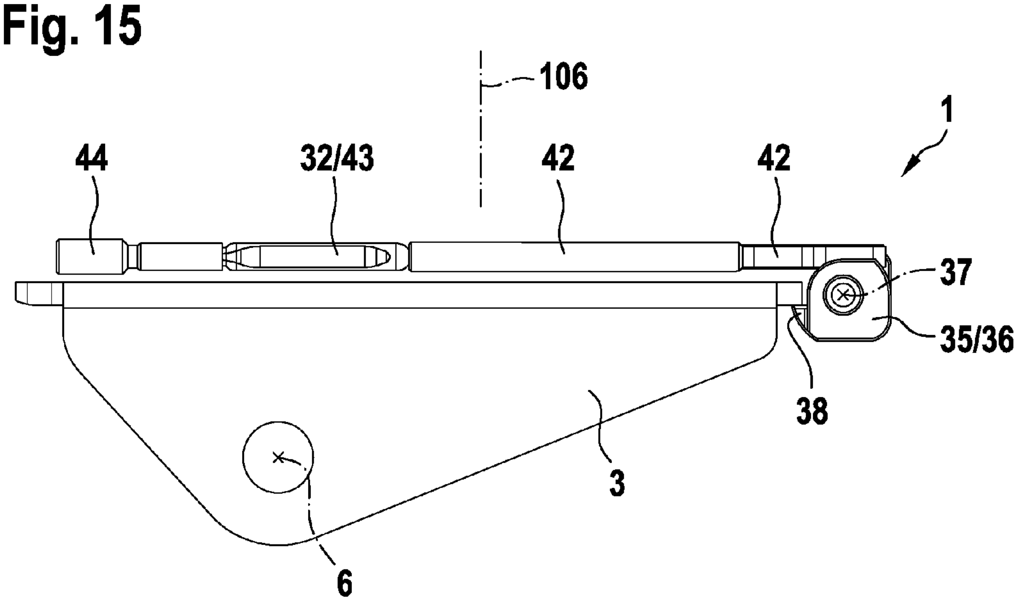
Figure 16:
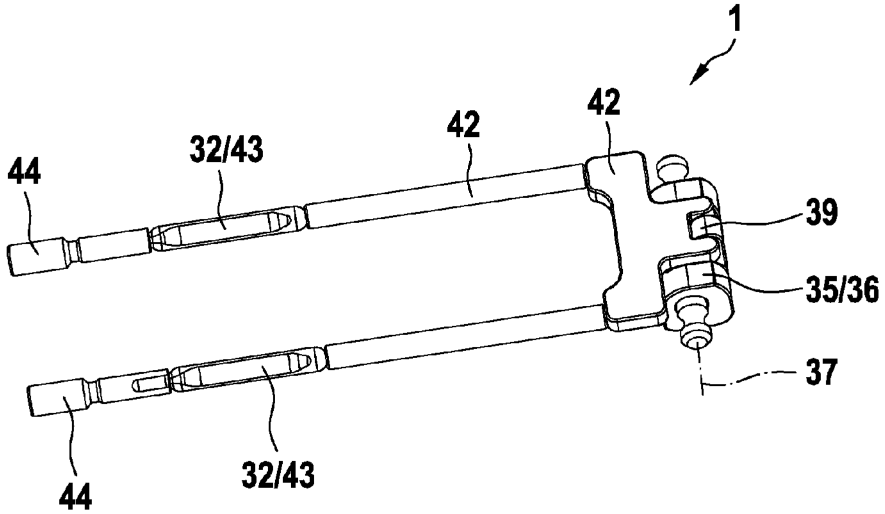

Sixth exemplary embodiment with FIGS. 15 and 16: In the illustration according to FIGS. 15 and 16, the hinge support 34 is hidden for the sake of clarity. Two trigger elements 32 designed as ampoules 43 are located in the hinge support 34. The ampoules 43 are supported against the second lever 39 of the swivel bolt 36 via corresponding intermediate elements 42. In the event of thermal activation and thus destruction of the ampoules 43, the swivel bolt 36 can be rotated. Corresponding tensioning screws 44 are screwed into the hinge support 34 in order to tension the two ampoules 43 in the hidden hinge support 34.

Figure 17:
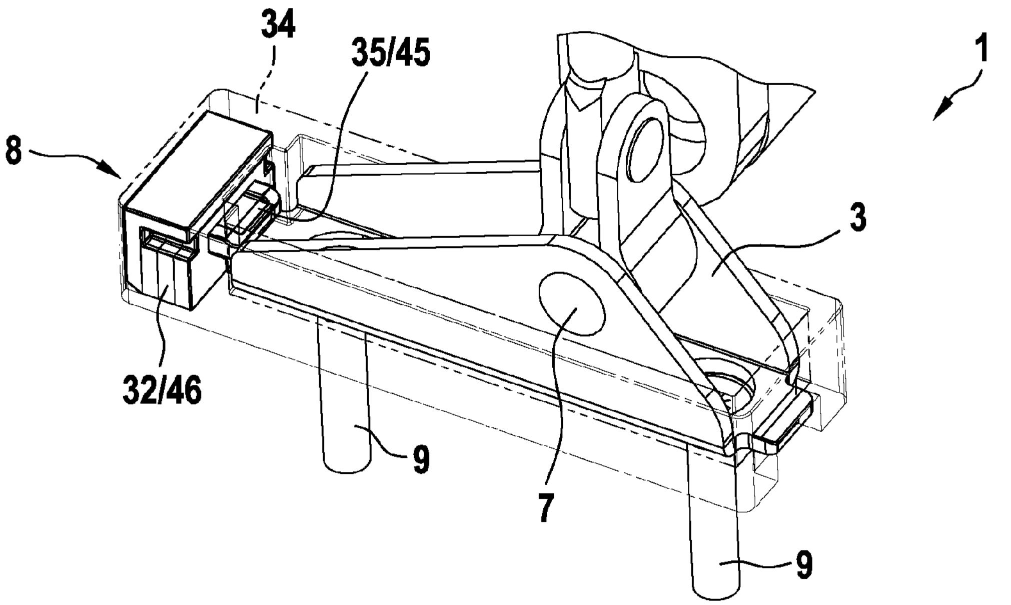
Figure 18:
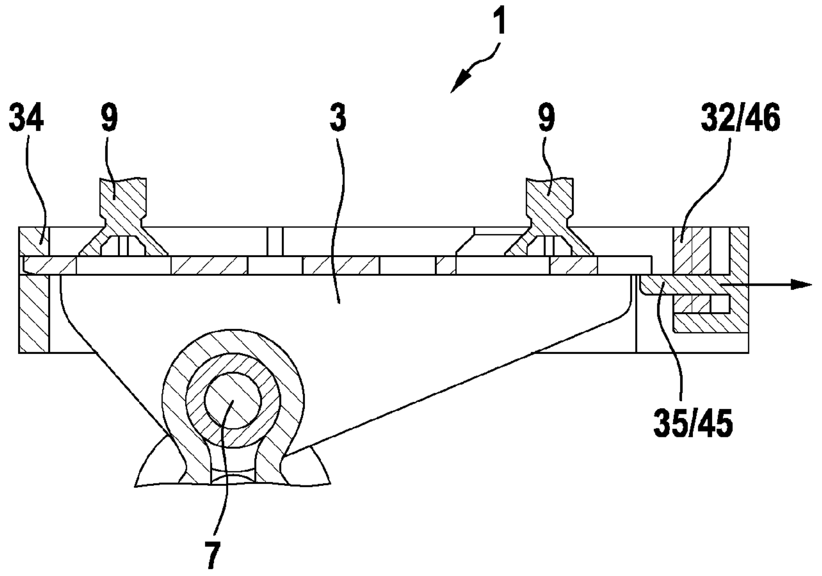

Seventh exemplary embodiment with FIGS. 17 and 18: In the seventh and the following eighth exemplary embodiment, the blocking element 35 is designed as a linearly displaceable bolt 45. In these variants, too, the hinge bracket 3 is pushed under the holder 40 on one side and is held on the opposing side by the blocking element 35, here as a bolt 45.

In FIGS. 17 and 18, the trigger element 32 is designed as a thermally intumescent element 46. When thermally activated, the volume of the thermally intumescent element 46 increases. The element 46 bears on the one hand against the hinge support 34 and on the other hand against the bolt 45 such that the bolt 45 is linearly displaceable into its release position.

Figure 19:
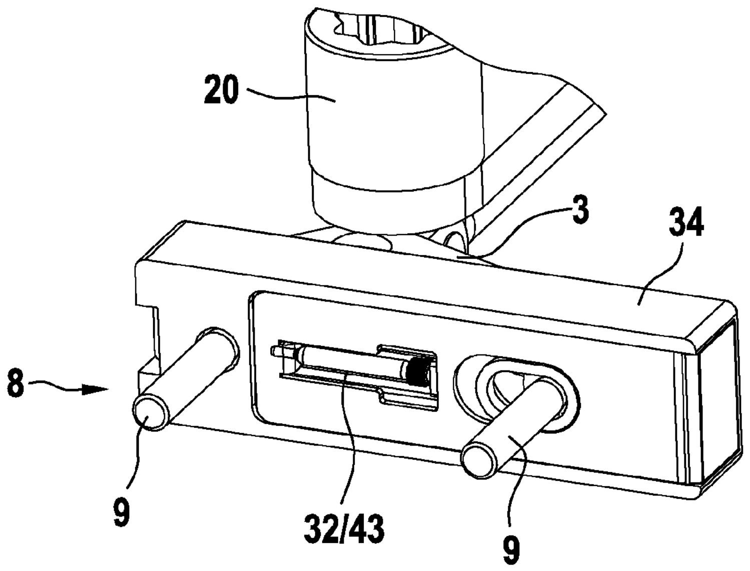
Figure 20:
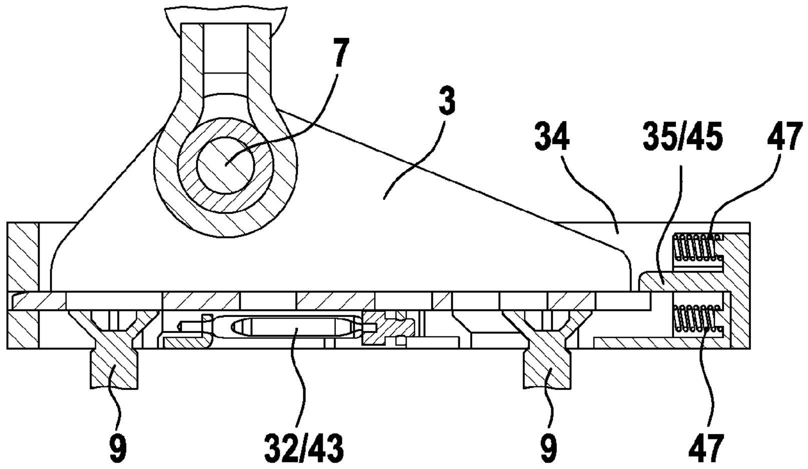

Eighth exemplary embodiment with FIGS. 19 and 20: At least one compression spring 47 is provided here, which is supported against the hinge support 34 and the bolt 45. In the normal state, the bolt 45 is loaded in its retaining position by the pretensioned compression spring 47. However, the trigger element 32, designed as an ampoule 43, holds the bolt 45 in the retaining position against the force of the compression spring 47. After the ampoule 43 has been destroyed, the force of the at least one compression spring 47 can move the bolt into the release position.

In the following exemplary embodiments with FIGS. 21 to 27, different variants are shown in which a plurality of blocking elements 35 are used to connect the hinge 2 and the hinge support 34. In particular, here the hinge support 34 is U-shaped and comprises two parallel legs between which the hinge bracket 3 is inserted.

Figure 21:
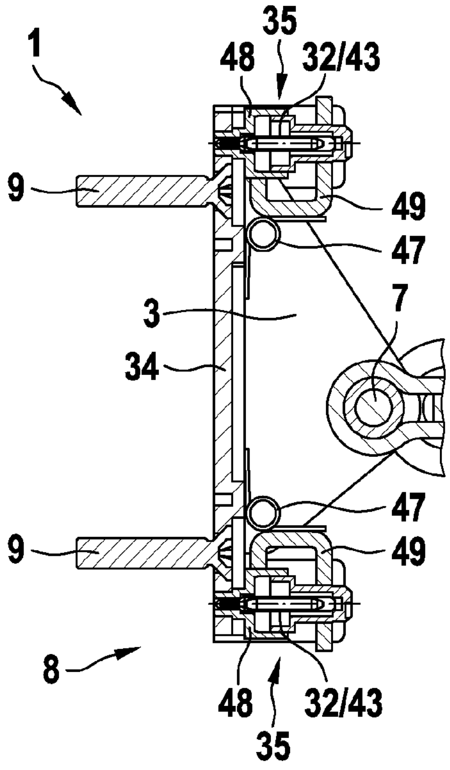
Figure 22:
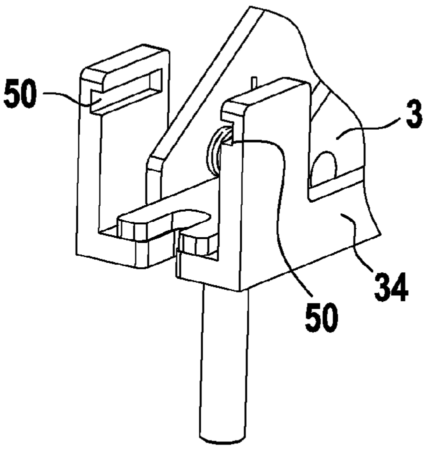
Figure 23:
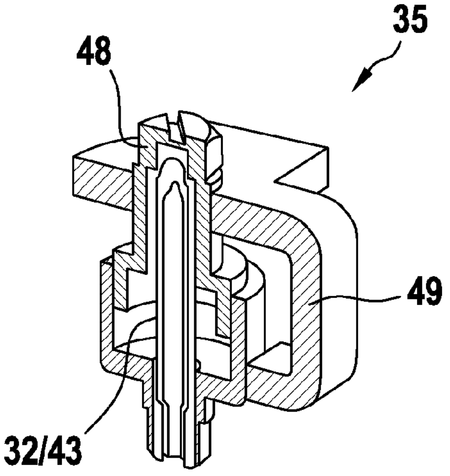

Ninth exemplary embodiment with FIGS. 21 to 23: Here two blocking elements 35 are provided, each of which is designed as follows; the blocking element 35 comprises a pin element 48. The pin element 48 consists here of two nested hollow elements, which are kept at a distance by the internal ampoule 43. The hinge bracket 3 is pressed against the hinge support 34 via a tensioning element 49 which is inserted into tensioning element grooves 50 of the hinge support 34. The pin element 48 with ampoule 32 keeps the tensioning element 49 tensioned. After the ampoule 43 has been destroyed, this pretensioning ceases such that the tensioning element 49 can be pushed out of the tensioning element grooves 50 by a compression spring 47, as a result of which the hinge bracket 3 detaches from the hinge support 34.

FIG. 22 shows the design with hidden blocking element 35. FIG. 23 shows a sectional view through the blocking element 35.

Figure 24:
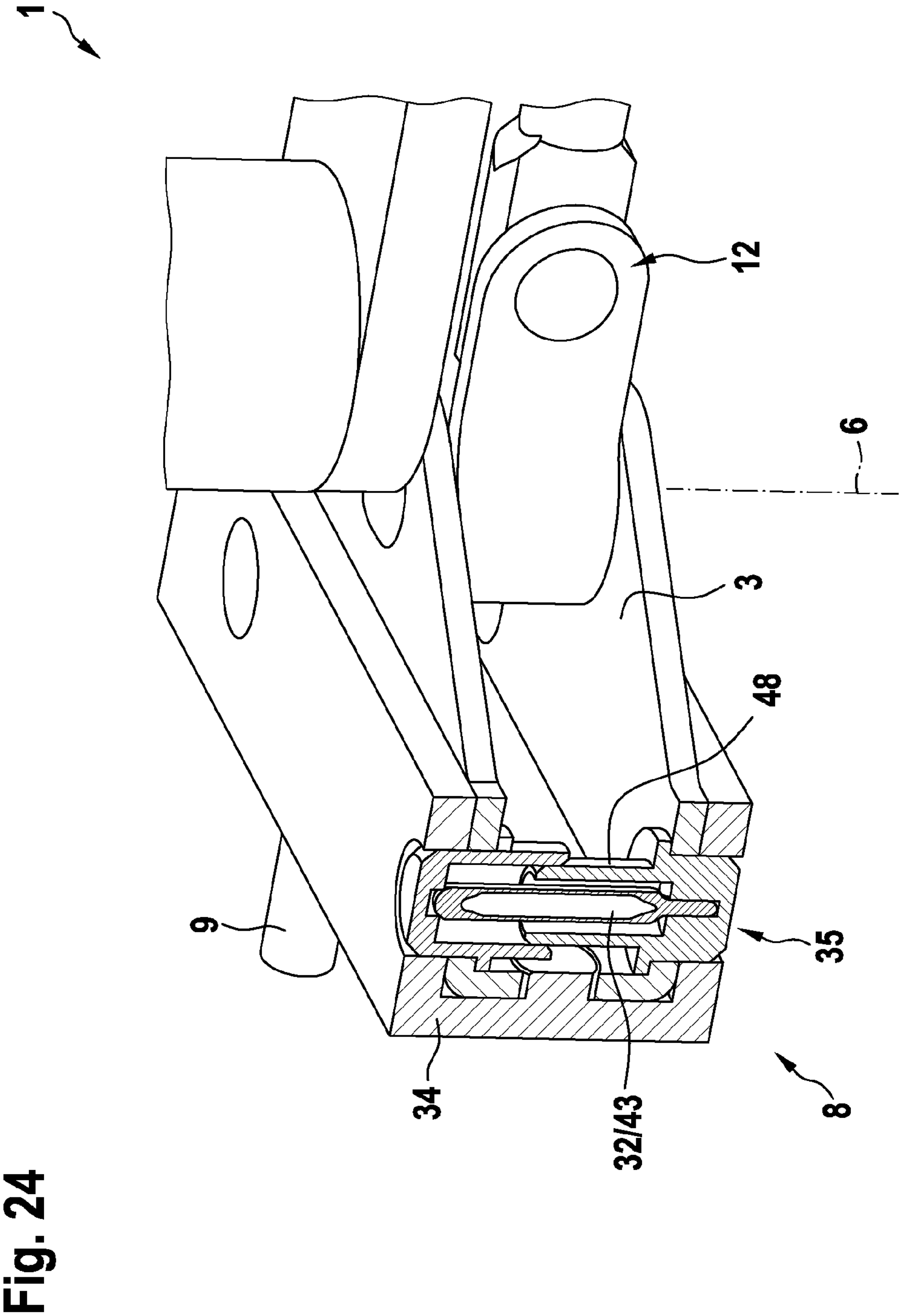

Tenth exemplary embodiment with FIG. 24: A blocking element 35 is shown, which is used in a plurality of positions for the connection between the hinge bracket 3 and the hinge support 34. The single blocking element 35 comprises the pin element 48 with two nested elements which are held at a distance by an internal ampoule 43. Two opposing ends of the pin element 48 are each inserted in associated recesses in the hinge support 34 and the hinge bracket 3. The pin element 48 and associated ampoule 43 extend vertically. By destroying the ampoule 43, the two parts of the pin element 48 can be moved towards one another or the upper element falls down. This causes the hinge 2 to detach from the hinge support 34.

Figure 25:
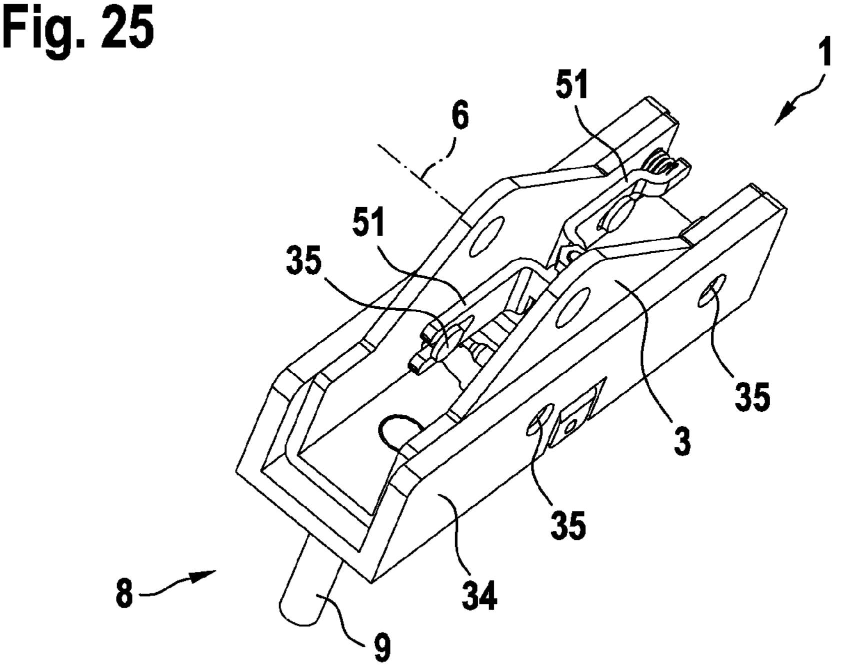
Figure 26:
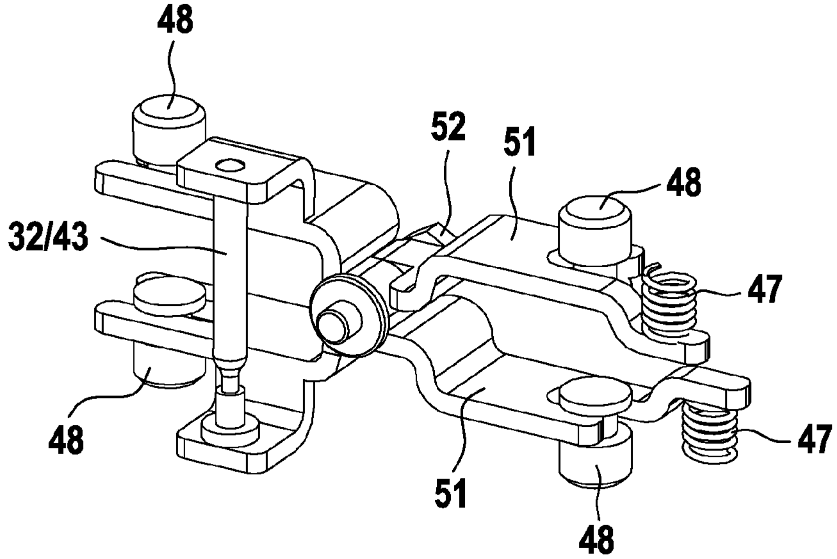

Eleventh exemplary embodiment with FIGS. 25 and 26: Here, in the hinge bracket 3, in particular between the two hinge legs 5, there is an arrangement of two scissor arms 51. The two scissor arms 51 are connected to one another at a scissor axis 52. In particular, the scissor axis 52 is fastened to the hinge base plate 4. FIG. 26 shows the arrangement with the two scissor arms 51 on their own.

The blocking elements 35 designed as pin elements 48 are located on the scissor arms 51 and are inserted into corresponding holes of the hinge support 34 and the hinge bracket 3.

Compression springs 47 are provided which are pretensioned and preload the scissor arms 51 into rotational movement about the scissor axis 52 in such manner that the scissor arms 51 pull the pin elements 58 out of their holes. However, this movement is blocked by the ampoule 43 such that before the ampoule 43 is destroyed, the movement of the scissor arms 51 is blocked.

Figure 27:
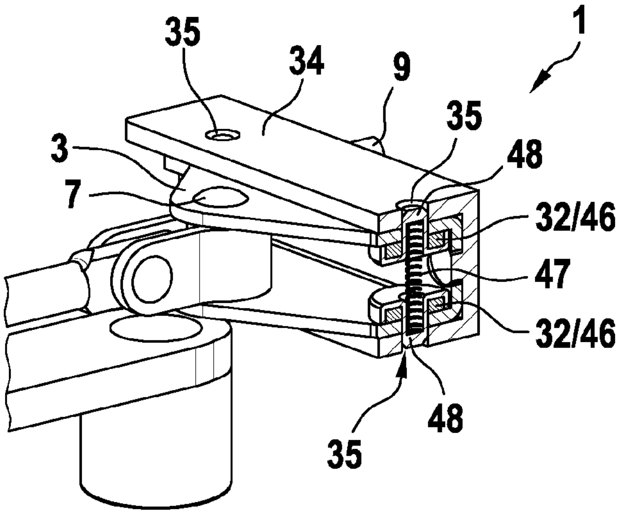

Twelfth exemplary embodiment with FIG. 27: A plurality of blocking elements 35 each with a pin element 48 are provided here. The pin element 48 is in turn inserted into corresponding holes in the hinge bracket 3 and hinge support 34. A thermally intumescent element 46 is provided as a trigger element 32 between the respective pin element 48 and the hinge bracket 3. When thermally activated, this thermally intumescent element 46 pushes the pin element 48 out of the corresponding holes.

Compression springs 47 are preferably provided here for holding the pin elements 48 in the retaining position, wherein the thermally intumescent element 46 moves the pin element 48 against the force of these compression springs 47 into the release position.

As FIG. 27 shows in the sectional illustration, two opposing blocking elements 35 can also be braced against one another with a common compression spring 47.

Figure 28:
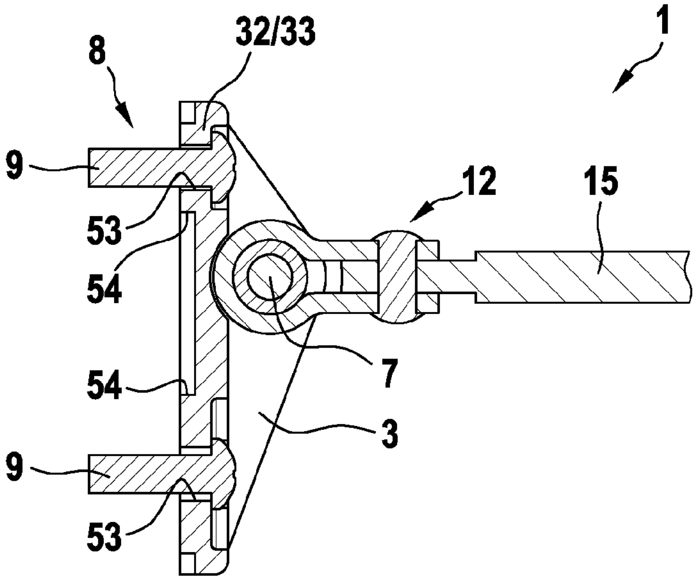

Thirteenth exemplary embodiment with FIG. 28: FIG. 28 shows a trigger element 32, which is designed as a fusible element 33, in a sectional view. This fusible element 33 has a first recess 53. In the hinge bracket 3, in particular the hinge base plate 4, a second recess 54 is provided. The two recesses 53, 54 are aligned and the screw 9 of the fastening arrangement 8 extends through both recesses 53, 54.

The diameter of the first recess 53 is so small that the screw head rests on the fusible element 33. The second recess 54 is selected to be large enough such that the screw head fits through the second recess 54 after deformation of the fusible element 33. As a result, the hinge 3 can detach from the screws 9 after the deformation of the fusible element 33.

As the illustration in FIG. 28 shows, the material of the fusible element 33 preferably extends through the second recess 54 such that direct contact between the fusible element 33 and the assembly surface 105 is possible for the transfer of heat.

Figure 29:
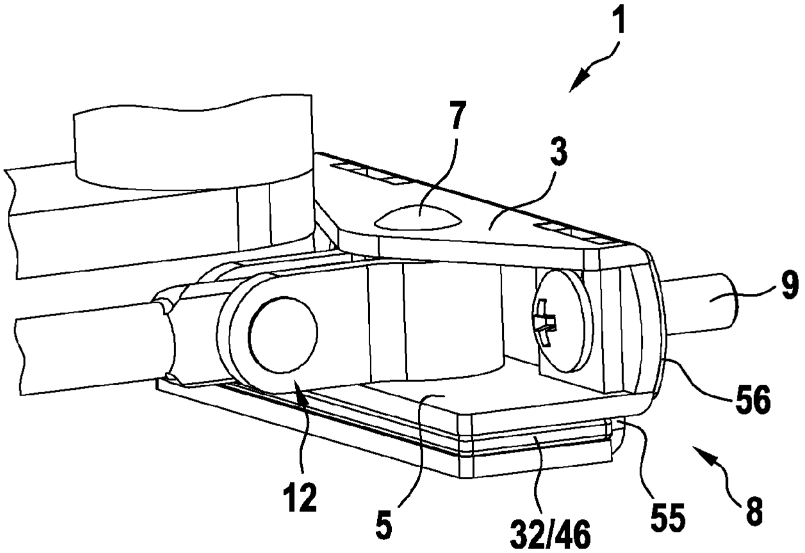
Figure 30:
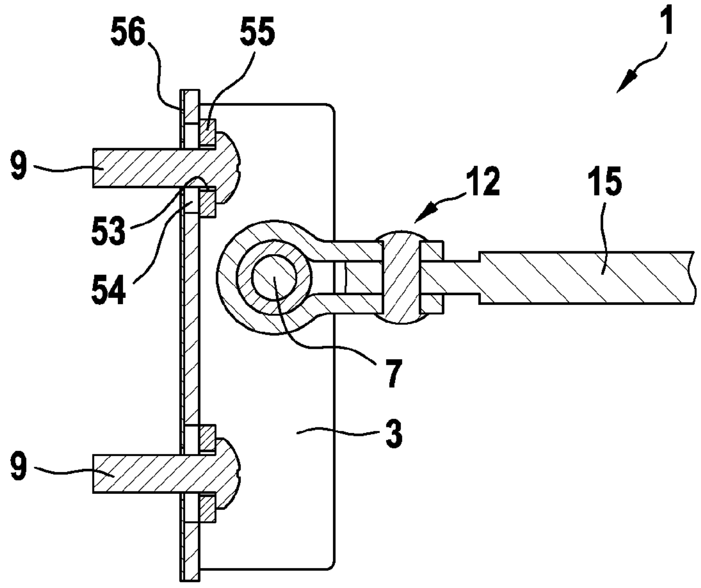

Fourteenth exemplary embodiment with FIGS. 29 and 30: An angled retaining element 55 is provided. The retaining element 55 has the smaller first recess 53. The larger second recess 54 is again provided in the hinge bracket 3. In the normal state, the screw head of the screw 9 rests against the retaining element 55. Only after the retaining element 55 has been displaced, here perpendicularly to the assembly axis 106, is the retaining element 55 pulled out from under the screw head such that the hinge 3 can be detached from the screw 9 again.

As shown in FIGS. 29 and 30, the retaining element 55 is angled such that one leg extends parallel to one of the hinge legs 5. The trigger element 32 is arranged as a thermally intumescent element 46 between the hinge leg 5 and the angled leg of the retaining element 55. When thermally activated, the retaining element 55 is displaced perpendicular to the assembly axis 106.

An intermediate plate 56 made of fusible material can be arranged between the hinge base plate 4 and the assembly surface 105 such that this intermediate plate 56 is deformed during the thermal activation and the pretensioning of the screws 9 is thus reduced.

Figure 31:
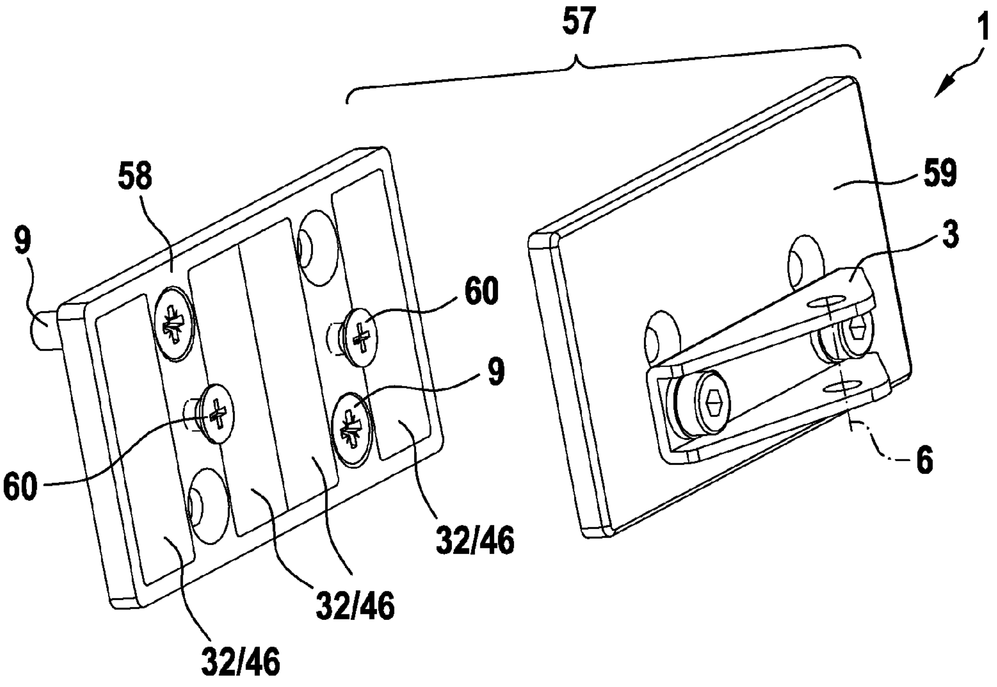

Fifteenth exemplary embodiment with FIG. 31: FIG. 31 shows an exploded illustration with a plurality of trigger elements 32 as thermally intumescent elements 46 in plate form. These elements 46 are arranged between the hinge 3 and the assembly surface 105 and can push the hinge 3 away from the assembly surface 105 when thermally activated. In the specific configuration, an assembly bracket 57 is provided for this purpose. This assembly bracket 57 comprises a first assembly plate 58 and a second assembly plate 59. The two assembly plates 58, 59 are screwed onto one another with predetermined break elements 60, for example screws. The first assembly plate 58 is to be firmly connected to the assembly surface 105 with the screws 9. The hinge 3 is firmly fastened to the second assembly plate 59 with corresponding screws.

The recesses for receiving the trigger elements 32 are located in the first assembly plate 58. When the thermally intumescent elements 46 expand, they push the second assembly plate 59 away from the assembly surface 105 or from the first assembly plate 58 such that the predetermined break elements 60 are destroyed or torn from their threads.

Such an assembly bracket or a similar assembly bracket can also be used to connect the door actuator 101 to its assembly surface in order to detach the door actuator 101 in the event of a fire and the associated heating.

Sixteenth exemplary embodiment with FIG. 32: The hinge 3 is shown with only one upper hinge leg 5. The connecting element 11 is placed on the hinge pin 7. The connecting element 11 is secured against falling with a disc 61 and the securing element 21 designed as a securing splint 62. The securing splint 62 inserts in the hinge pin 7.

The trigger element 32, here as a shape-memory element 63, is tensioned in the form of a spring between the securing splint 32 and the hinge support 34. When the shape-memory element 63 heats up thermally, it contracts and thereby pulls the securing splint 62, as a result of which the connecting element 11 can fall downwards.

Seventeenth exemplary embodiment with FIGS. 33 and 34: Here, as in FIG. 32, the securing splint 62 is provided on the hinge pin 7. By pulling the securing splint 62, the connecting element 11 can be detached downwards.

The securing splint 62 can be pulled via a pretensioned tension spring 64. However, a contraction of the tension spring 64 is blocked by the trigger element 32 in the form of an ampoule 43. Only after the ampoule 43 has been destroyed can the tension spring 64 contract.

FIG. 34 shows a variant of FIG. 33, with which the securing splint 62 can also be pulled with a compression spring 47. The compression spring 47 is pretensioned here, and the release of its tension is blocked by the ampoule 43. The ampoule 43 is supported against the compression spring 47 and the hinge support 34.

The invention claimed is:

1. A linkage for force transmission between a driven axle of a door actuator and an assembly surface, comprising:

a hinge;

a fastening arrangement designed to fasten the hinge to the assembly surface, wherein an assembly axis is defined perpendicularly to the assembly surface;

a lever arrangement which is fastened to the hinge so as to be rotatable about a hinge axis perpendicular to the assembly axis and which is designed for rotationally-fixed connection to the driven axle of the door actuator, wherein the linkage is designed to detach through the weight of the door actuator falling down in the event of a fire and/or wherein the linkage comprises a thermally activatable trigger element that is designed to detach the linkage in the event of thermal activation triggered by a fire; and a securing element is arranged on a hinge joint or the hinge and is configured for holding together the hinge joint or the hinge, wherein the lever arrangement comprises a first lever, the hinge joint, and a connecting element, wherein the connecting element is fastened to the hinge so as to be rotatable, and the first lever is rotatably connected to the connecting element via the hinge joint, wherein a hinge joint axis is perpendicular to the hinge axis.

2. The linkage according to claim 1, wherein the hinge or a joint in the lever arrangement is designed to detach through the weight of the falling door actuator.

3. The linkage according to claim 1, wherein the securing element, by the first lever being lowered, is configured to be moved into a non-constrained position which does not hold the hinge joint or hinge together.

4. The linkage according to claim 3, wherein the first lever comprises an actuating section which protrudes beyond the hinge joint axis in the direction of the hinge and which moves upwards when the first lever is lowered and thereby moves the securing element to the non-constrained position.

5. The linkage according to claim 4, wherein the hinge comprises a hinge pin, wherein the hinge pin is secured against falling out with the securing element, configured as a securing tab, securing splint or securing screw.

6. The linkage according to claim 5, wherein the hinge comprises a hinge leg only on the upper side of the connecting element, in which the hinge pin is received.

7. The linkage according to claim 5, wherein the securing element, configured as a securing tab or a securing splint, is configured to be pulled off the hinge pin.

8. The linkage according to claim 5, wherein the securing element, configured as a securing screw, is configured to be destroyed by the movement of the actuating section.

9. The linkage according to claim 3, wherein the securing element is a securing sleeve which sits on the hinge joint.

10. The linkage according to claim 9, wherein the hinge joint has a hinge joint pin and a U-shaped, downwardly open first pin receptacle on the connecting element and/or on the first lever, wherein the securing sleeve with a U-shaped, laterally open second pin receptacle holds the hinge joint pin in the first pin receptacle, and wherein the securing sleeve is configured to be removed from the hinge joint pin to detach the hinge joint.

11. The linkage according to claim 2, wherein the lever arrangement comprises the first lever and a second lever, wherein the two levers are connected to one another with a ball joint, and wherein the ball joint is designed to detach through the weight of the falling door actuator.

* * * * *